(12) United States Patent
Hwang

(10) Patent No.: US 9,696,815 B2
(45) Date of Patent: Jul. 4, 2017

(54) METHOD, DEVICE, SYSTEM AND NON-TRANSITORY COMPUTER-READABLE RECORDING MEDIUM FOR PROVIDING USER INTERFACE

(71) Applicant: FuturePlay Inc., Seoul (KR)

(72) Inventor: Sung Jae Hwang, Seoul (KR)

(73) Assignee: Futureplay Inc., Seoul (KR)

( * ) Notice: Subject to any disclaimer, the term of this patent is extended or adjusted under 35 U.S.C. 154(b) by 0 days.

(21) Appl. No.: 14/819,151

(22) Filed: Aug. 5, 2015

(65) Prior Publication Data

US 2016/0098091 A1    Apr. 7, 2016

(30) Foreign Application Priority Data

Oct. 2, 2014 (KR) .......... 10-2014-0132936
Apr. 13, 2015 (KR) .......... 10-2015-0051767

(51) Int. Cl.
*G06F 3/048* (2013.01)
*G06F 3/01* (2006.01)
(Continued)

(52) U.S. Cl.
CPC .............. *G06F 3/017* (2013.01); *G06F 3/038* (2013.01); *G06F 3/0488* (2013.01); *G06F 3/1423* (2013.01); *G06F 3/1454* (2013.01); *G06F 21/606* (2013.01); *H04M 1/7253* (2013.01); *G06F 2203/0381* (2013.01); *G06F 2203/0384* (2013.01); *G09G 2354/00* (2013.01);
(Continued)

(58) Field of Classification Search
CPC ...... G06F 3/04883; G06F 3/017; G06F 3/016; G06F 2203/04808; G06F 3/011; G06F 3/014; G06F 1/1615; G06F 1/163; G06K 9/00355

USPC .......................................... 715/761
See application file for complete search history.

(56) References Cited

U.S. PATENT DOCUMENTS 8,983,539 B1* 3/2015 Kim .................. G06F 13/14
345/2.3
9,395,948 B2* 7/2016 Yoshikawa ........... G06F 3/1454
(Continued)

FOREIGN PATENT DOCUMENTS

WO    WO 2014/084634    6/2014

OTHER PUBLICATIONS

Chen, Xiang'Anthony, et al. "Duet: exploring joint interactions on a smart phone and a smart watch." Proceedings of the SIGCHI Conference on Human Factors in Computing Systems. ACM, 2014.*

(Continued)

*Primary Examiner* — David Phantana Angkool
(74) *Attorney, Agent, or Firm* — Dinsmore & Shohl LLP; Yongsok Choi

(57) ABSTRACT

According to one aspect of the present invention, there is provided a method for providing a user interface, comprising the steps of: (a) acquiring information on postures or motions of a first device and a second device, and sensing an input event specified on the basis of a relative relationship between the posture or motion of the first device and that of the second device; and (b) in response to the occurrence of the input event, causing at least some of contents and functions provided on the first device to be provided on the second device, or causing at least some of contents and functions provided on the second device to be provided on the first device.

7 Claims, 12 Drawing Sheets

(51) Int. Cl.
*G06F 3/14* (2006.01)
*G06F 3/0488* (2013.01)
*G06F 3/038* (2013.01)
*G06F 21/60* (2013.01)
*H04M 1/725* (2006.01)

(52) U.S. Cl.
CPC ... *G09G 2358/00* (2013.01); *G09G 2370/022* (2013.01); *G09G 2370/16* (2013.01); *G09G 2370/20* (2013.01); *G09G 2380/08* (2013.01)

(56) References Cited

U.S. PATENT DOCUMENTS

| | | | | |
|---|---|---|---|---|
| 9,569,759 | B2* | 2/2017 | Gangapurkar | G06Q 30/06 |
| 2012/0032783 | A1* | 2/2012 | Ahn | G06F 3/1423 340/6.1 |
| 2012/0060109 | A1* | 3/2012 | Han | G06F 3/1454 715/769 |
| 2013/0113993 | A1* | 5/2013 | Dagit, III | G06F 3/017 348/552 |
| 2014/0006194 | A1* | 1/2014 | Xie | G06Q 20/3278 705/21 |
| 2014/0043209 | A1* | 2/2014 | Walker | G09G 5/006 345/1.2 |
| 2014/0045547 | A1 | 2/2014 | Singamsetty et al. | |
| 2014/0046842 | A1* | 2/2014 | Irudayam | G07F 19/202 705/43 |
| 2014/0135631 | A1 | 5/2014 | Brumback et al. | |
| 2014/0139454 | A1 | 5/2014 | Mistry et al. | |
| 2014/0181954 | A1 | 6/2014 | Robertson et al. | |
| 2014/0368734 | A1* | 12/2014 | Hoffert | H04N 5/44591 348/564 |
| 2015/0085621 | A1 | 3/2015 | Hong et al. | |
| 2015/0153928 | A1* | 6/2015 | Chen | G06F 3/04886 715/863 |
| 2015/0160622 | A1 | 6/2015 | Kim et al. | |
| 2015/0242663 | A1* | 8/2015 | Babu | G06F 1/3215 235/380 |
| 2015/0348001 | A1* | 12/2015 | Van Os | G06Q 20/40 705/44 |
| 2017/0017937 | A1* | 1/2017 | Lim | G06Q 20/10 |

OTHER PUBLICATIONS

Gubbi, Jayavardhana, et al. "Internet of Things (IoT): A vision, architectural elements, and future directions." Future Generation Computer Systems 29.7 (2013): 1645-1660.*

Miorandi, Daniele, et al. "Internet of things: Vision, applications and research challenges." Ad Hoc Networks 10.7 (2012): 1497-1516.*

* cited by examiner (a)　　　　　　(b)　　　　　　(c)

(a)　　　　　　(b)　　　　　　(c)

(a)  (b)

Visual          Aural or Tactual

METHOD, DEVICE, SYSTEM AND NON-TRANSITORY COMPUTER-READABLE RECORDING MEDIUM FOR PROVIDING USER INTERFACE

PRIORITY CLAIM

This application claims the benefit of Korean Patent Application No. 10-2014-0132936, filed on Oct. 2, 2014, and Korean Patent Application No. 10-2015-0051767, filed on Apr. 13, 2015, the entire contents both of which are incorporated herein by reference for all purposes as if fully set forth herein.

FIELD OF THE INVENTION

The present invention relates to a method, device, system and non-transitory computer-readable recording medium for providing a user interface.

BACKGROUND

Recently, mobile smart devices having various communication and sensing capabilities and powerful computing capabilities, such as smart phones and smart pads, are being widely used. Among such mobile smart devices, there are relatively small-sized ones that may be worn and carried on a body of a user (e.g., a smart glass, a smart watch, a smart band, a smart device in the form of a ring or a brooch, a smart device directly attached to or embedded in a body or a garment, etc.)

In this situation, a user may desire to perform a task using two or more (different kinds of) smart devices of the user, or may desire a task to be performed in which smart devices of the user and another user are required to be involved together. However, this (latent) intention of the user could not have been properly supported in prior art.

SUMMARY OF THE INVENTION

One object of the present invention is to fully solve the above problem.

Another object of the invention is to provide a user with a more convenient and extended user interface using a relative relationship between postures or motions of two or more devices, by acquiring information on postures or motions of a first device and a second device, sensing an input event specified on the basis of a relative relationship between the posture or motion of the first device and that of the second device, and in response to the occurrence of the input event, causing at least some of contents and functions provided on the first device to be provided on the second device, or causing at least some of contents and functions provided on the second device to be provided on the first device.

According to one aspect of the invention to achieve the objects as described above, there is provided a method for providing a user interface, comprising the steps of: (a) acquiring information on postures or motions of a first device and a second device, and sensing an input event specified on the basis of a relative relationship between the posture or motion of the first device and that of the second device; and (b) in response to the occurrence of the input event, causing at least some of contents and functions provided on the first device to be provided on the second device, or causing at least some of contents and functions provided on the second device to be provided on the first device.

According to another aspect of the invention, there is provided a device for providing a user interface, comprising: a sensing module for acquiring information on postures or motions of the device and another device associated with the device, and sensing an input event specified on the basis of a relative relationship between the posture or motion of the device and that of the another device; and a program module for, in response to the occurrence of the input event, causing at least some of contents and functions provided on the device to be provided on the another device, or causing at least some of contents and functions provided on the another device to be provided on the device.

According to yet another aspect of the invention, there is provided a system for providing a user interface, comprising: a control unit for acquiring information on postures or motions of a first device and a second device, sensing an input event specified on the basis of a relative relationship between the posture or motion of the first device and that of the second device, and in response to the occurrence of the input event, causing at least some of contents and functions provided on the first device to be provided on the second device, or causing at least some of contents and functions provided on the second device to be provided on the first device; and a storage for storing information provided from at least one of the first device and the second device.

In addition, there are further provided other methods, devices and systems to implement the invention, as well as non-transitory computer-readable recording media having stored thereon computer programs for executing the methods.

According to the invention, a more convenient and extended user interface may be provided to a user using a relative relationship between postures or motions of two or more devices.

According to the invention, a user wearing a second device on a body part like a wrist of a hand and holding a first device in the same hand has only to make an action of turning over the hand (i.e., flipping) so that content (or function) provision states in the first and second devices may be switched with each other.

According to the invention, a user carrying both of first and second devices facing different directions may receive contents or functions via the first and second devices with continuity thereof being maintained, regardless of a posture or direction of the hand carrying the devices.

According to the invention, a first user carrying a first device and a second user carrying a second device have only to make a simple action corresponding to an input event so that contents (or functions) may be shared with continuity between the first and second devices.

DETAILED DESCRIPTION OF THE PREFERRED EMBODIMENTS

Figure 1:
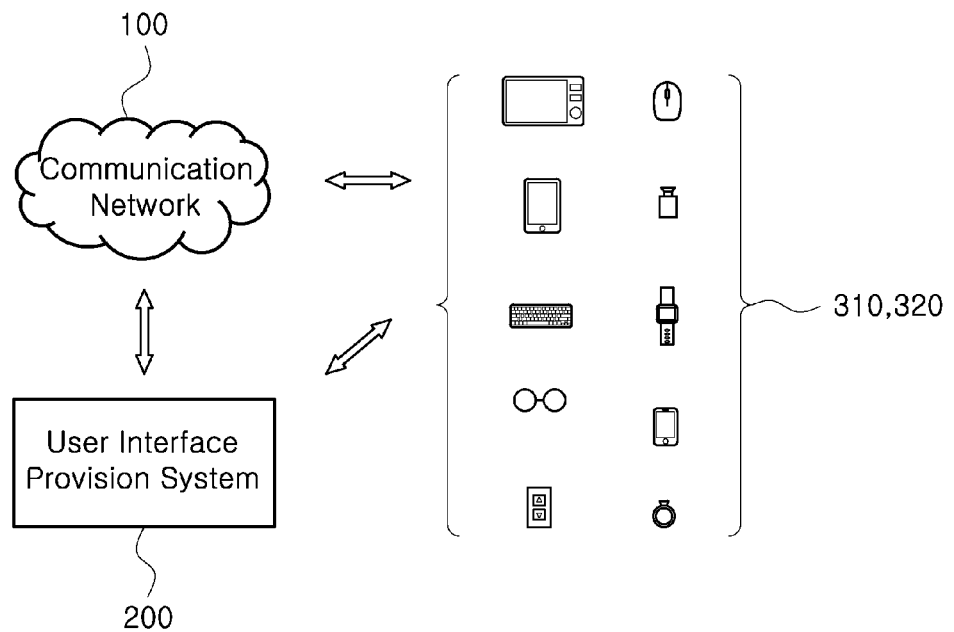
FIG. 1 schematically shows the configuration of an entire system for providing a user interface according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of an Entire System

FIG. 1 schematically shows the configuration of an entire system for providing a user interface according to one embodiment of the invention.

As shown in FIG. 1, the entire system according to one embodiment of the invention may comprise a communication network 100, a user interface provision system 200, and multiple devices 310, 320.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

Next, the user interface provision system 200 according to one embodiment of the invention may be digital equipment having a memory means and a microprocessor for computing capabilities. The user interface provision system 200 may be a server system. The user interface provision system 200 may function to mediate so that via the communication network 100, one of the devices 310, 320 may transmit information or a control command to the other, or the one may receive information or a control command from the other.

To this end, as will be described in detail below, the user interface provision system 200 may function to provide a user with a more convenient and extended user interface using a relative relationship between postures or motions of two or more devices, by acquiring information on postures or motions of a first device and a second device, sensing an input event specified on the basis of a relative relationship between the posture or motion of the first device and that of the second device, and in response to the occurrence of the input event, causing at least some of contents and functions provided on the first device to be provided on the second device, or causing at least some of contents and functions provided on the second device to be provided on the first device.

The provision of the user interface may be performed by a control unit (not shown) included in the user interface provision system 200. The control unit may reside in the user interface provision system 200 in the form of a program module. The program module may be in the form of an operating system, an application program module, or other program modules. Further, the program module may also be stored in a remote storage device that may communicate with the user interface provision system 200. Meanwhile, such a program module may include, but not limited to, a routine, a subroutine, a program, an object, a component, a data structure and the like for performing a specific task or executing a specific abstract data type as will be described below in accordance with the invention.

Further, the user interface provision system 200 may further function to store information on posture or motion provided from at least one of the multiple devices 310, 320 and allow the information to be used by at least one of the multiple devices 310, 320. Furthermore, the user interface provision system 200 may further function to store information constituting contents or functions provided in at least one of the multiple devices 310, 320 and allow the information to be used by at least one of the multiple devices 310, 320. The storing may be performed by a storage (not shown) included in the user interface provision system 200. The storage encompasses a computer-readable recording medium, and may refer not only to a database in a narrow sense but also to a database in a broad sense including file-system based data records and the like.

The function of the user interface provision system 200 will be discussed in more detail below. Meanwhile, although the user interface provision system 200 has been described as above, the above description is illustrative and it is apparent to those skilled in the art that at least some of the functions or components required for the user interface provision system 200 may be implemented or included in at least one of the multiple devices 310, 320 to be operated, as necessary.

Lastly, the multiple devices 310, 320 according to one embodiment of the invention are digital equipment that may function to connect to and then communicate with the user interface provision system 200 or a counterpart of the multiple devices 310, 320 (which may preferably be separated or externalized from each other), and any type of digital equipment having a memory means and a microprocessor for computing capabilities may be adopted as the devices 310, 320 according to the invention. The devices 310, 320 may be so-called smart devices such as a smart phone, a smart pad, a smart glass, a smart watch, a smart band, and a smart ring, or may be somewhat traditional devices such as a desktop computer, a notebook computer, a workstation, a personal digital assistant (PDA), a web pad, a mobile phone, buttons, a mouse, a keyboard, and an electronic pen. Further, the devices 310, 320 may be Internet of Things (IoT) devices such as a remote control and a home appliance.

Particularly, according to one embodiment of the invention, the devices 310, 320 may include at least one technical means for receiving an operation from a user. Examples of the technical means may include commonly known components such as a touch panel, a pointing tool (e.g., a mouse, a stylus, an electronic pen, etc.), a graphical object operable by the user, a keyboard, a toggle switch, a biometrics (like fingerprints) sensor, a distance sensor, and the like.

Further, according to one embodiment of the invention, the devices 310, 320 may include at least one technical means for acquiring physical information on postures or motions of the devices 310, 320. Examples of the technical means may include sensing modules which are commonly known components such as a motion sensor, an acceleration sensor, a gyroscope, a magnetic sensor, a positioning module (a GPS module, a beacon-based positioning (position identification) module, etc.), a barometer, a distance sensor, a camera, and the like.

Furthermore, according to one embodiment of the invention, the devices 310, 320 may include a technical means for acquiring physical information on postures or motions of the devices 310, 320 on the basis of biometrics acquired from a body of a user carrying the devices 310, 320. Examples of the technical means may include sensing modules such as an electromyogram (EMG) signal measurement apparatus and the like.

Moreover, the devices 310, 320 may further include an application program for processing the above physical information to transmit information or a control command to another device (310, 320, or the like), to receive information or a control command from another device (310, 320, or the like), or to generate the information or control command. The application may reside in the corresponding devices 310, 320 in the form of a program module. The nature of the program module may be generally similar to that of the aforementioned control unit of the user interface provision system 200. Here, at least a part of the application may be replaced with a hardware or firmware device that may perform a substantially equal or equivalent function, as necessary.

Meanwhile, according to one embodiment of the invention, when it is recognized that the first device 310 and the second device 320 have an association (e.g., indicating that they belong to the same user, they function for the sake of the same user, they are located substantially close to each other, or one of them is competent to authenticate or permit the other), a connection may be formed between the first device 310 and the second 320. The recognition or connection may be performed by the user interface provision system 200 or by the first device 310 and the second device 320.

Embodiments

Hereinafter, specific examples will be discussed in detail wherein the user interface providing system 200 according to the invention provides a user interface in which the multiple devices 310, 320 are involved according to various embodiments of the invention.

According to one embodiment of the invention, the user interface providing system 200 may acquire information on postures or motions of the first device 310 and the second device 320, sense an input event specified on the basis of a relative relationship between the posture or motion of the first device 310 and that of the second device 320, and in response to the occurrence of the input event, cause at least some of contents and functions provided on the first device 310 to be provided on the second device 320, or cause at least some of contents and functions provided on the second device 320 to be provided on the first device 310.

Specifically, according to one embodiment of the invention, at least one of the first device 310 and the second device 320 may be integrally combined and moved with an object for generating the input event (e.g., a body part of a user). For example, the first device 310 may be a smart phone that a user may hold in a hand, and the second device 320 may be a smart watch that may be worn on a wrist of the user.

Further, according to one embodiment of the invention, an input event specified on the basis of a relative relationship between the posture or motion of the first device 310 and that of the second device 320 may indicate an event in which the aspect of direction change of the first device 310 is opposite or symmetrical to that of direction change of the second device 320, with respect to at least one coordinate axis. For example, according to one embodiment of the invention, an input event may indicate an event in which the user makes an action of turning over the hand holding the first device 310 and wearing the second device 320 on the wrist thereof (which is so-called flipping).

Meanwhile, according to one embodiment of the invention, an input event may be specified on the basis of a relative relationship between the posture or motion of the first device 310 with respect to a first surface and that of the second device 320 with respect to a second surface. Here, the first surface or the second surface may correspond to a top surface, a bottom surface, a left surface, a right surface, a front surface, a rear surface, or the like of the first device 310 or the second device 320.

Figure 2:
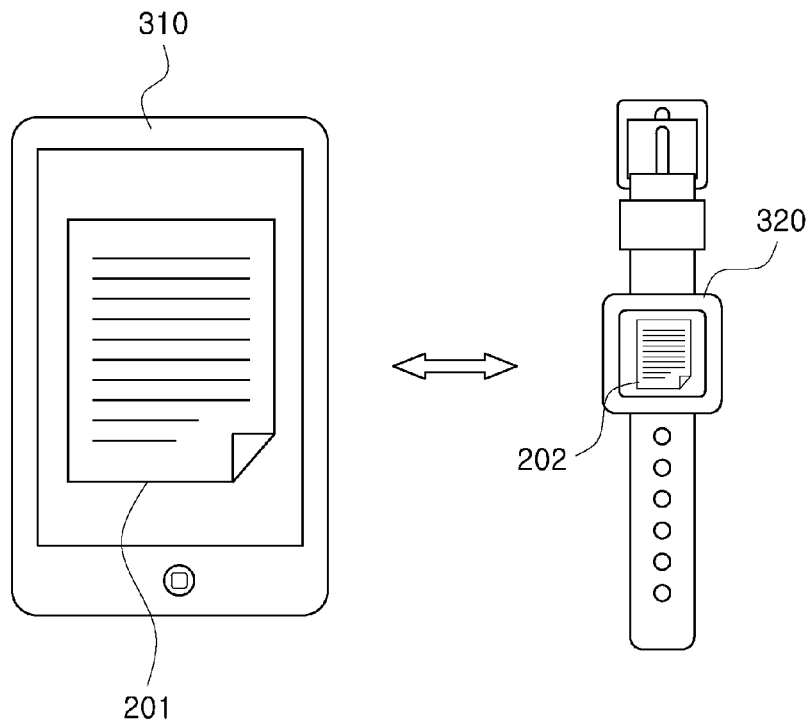
FIG. 2 conceptually shows how content (or function) provision states are switched between first and second devices according to one embodiment of the invention.

FIG. 2 conceptually shows how content (or function) provision states are switched between the first and second devices according to one embodiment of the invention.

In general, if a user holding the first device 310 in a hand and wearing the second device 320 on a wrist of the same hand makes an action of turning over the hand (i.e., flipping), then it may be difficult for the first device 310 or the second device 320, which has been providing contents (or functions) to the user with a display screen thereof facing the user before the action, to further provide the contents (or functions) to the user after the action because the display screen does not face the user.

Figure 16:
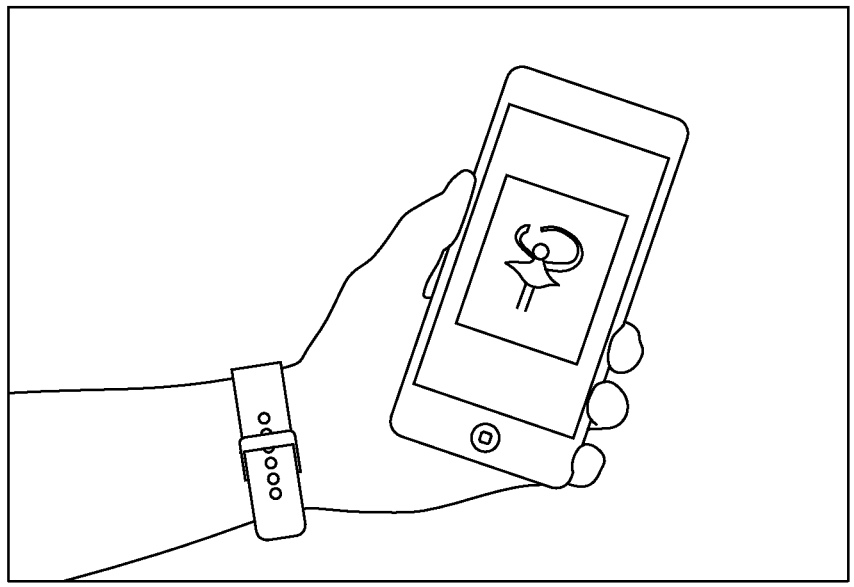
FIGS. 16 to 22 illustratively show actual demonstrations of user interfaces provided according to various embodiments of the invention.
Figure 17:
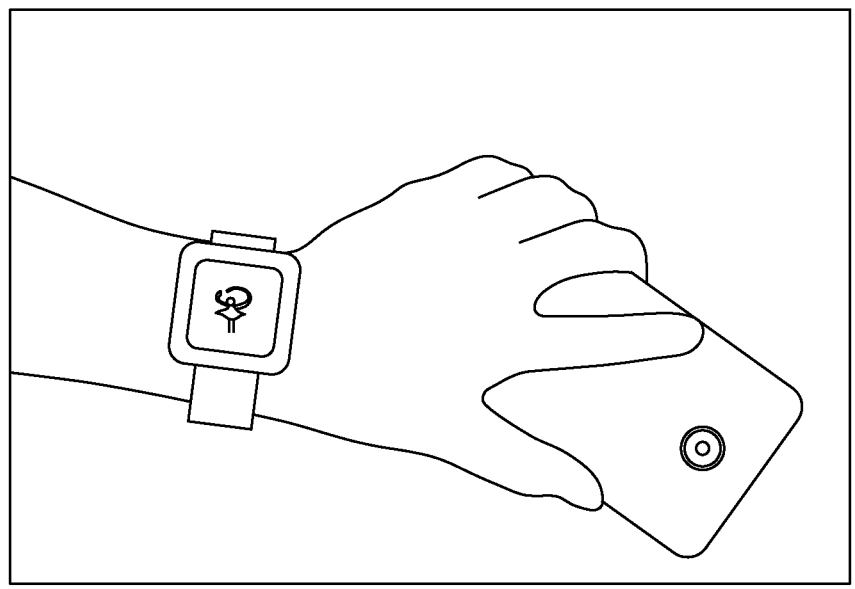

Referring to FIG. 2, when a user makes an action of flipping to turn over the hand carrying both of the first device 310 and the second device 320 facing different directions, the user interface provision system 200 according to one embodiment of the invention may recognize the above action as an input event in which the aspect of direction change of the first device 310 in the form of a smart phone is opposite or symmetrical to that of direction change of the second device 320 in the form of a smart watch, and may cause at least some of contents (or functions) 201, 202 having been being provided on the first device 310 (or the second device 320), a display screen of which has been facing the user before the occurrence of the input event, to be provided on the second device 320 (or the first device 310), a display screen of which has come to face the user after the occurrence of the input event. Therefore, according to the invention, the contents (or functions) provided to the user may be provided via both of the first device 310 and the second device 320 with continuity thereof being maintained. Referring to FIGS. 16 and 17, it can be seen how the above embodiment is actually demonstrated.

Figure 3:
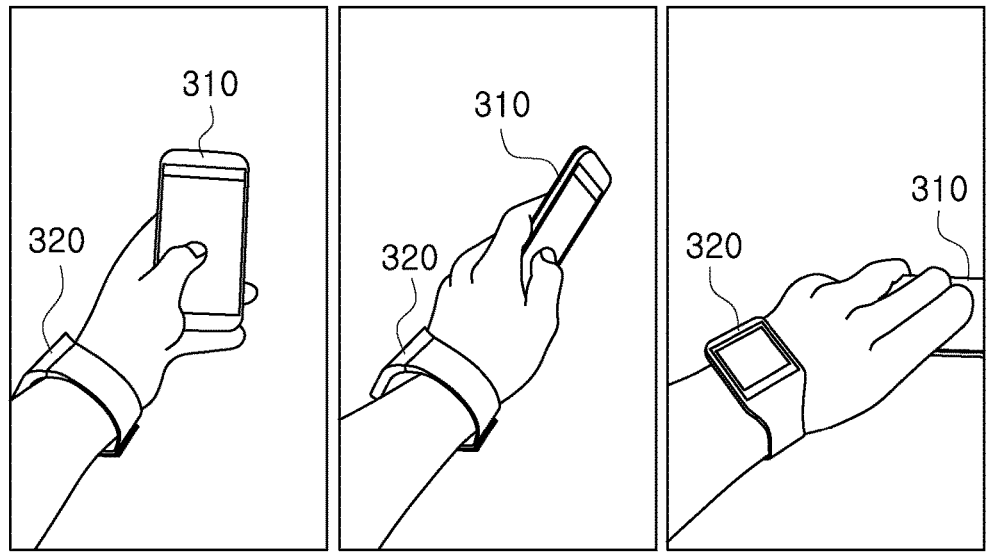
FIGS. 3 to 5 illustratively show how a user interface is provided according to one embodiment of the invention.
Figure 4:
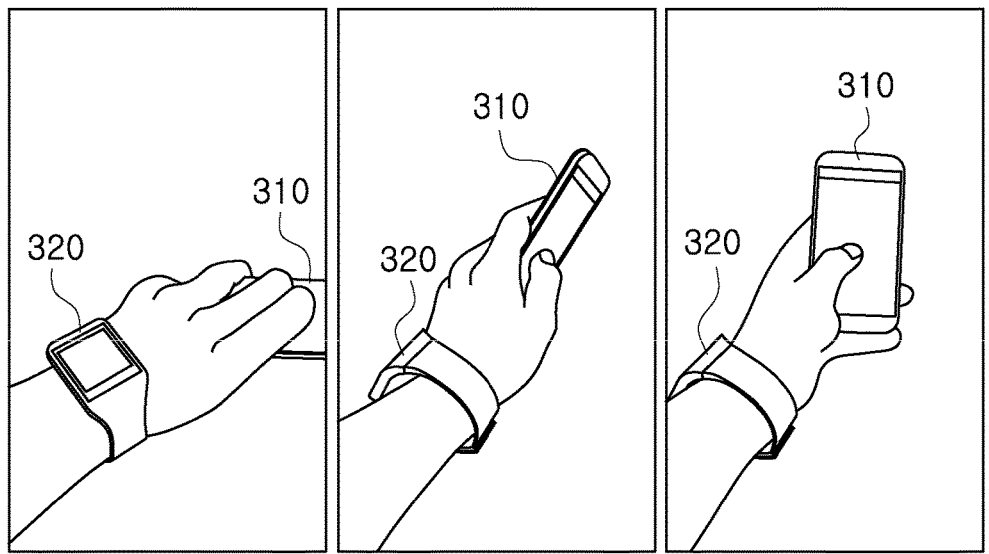
Figure 5:
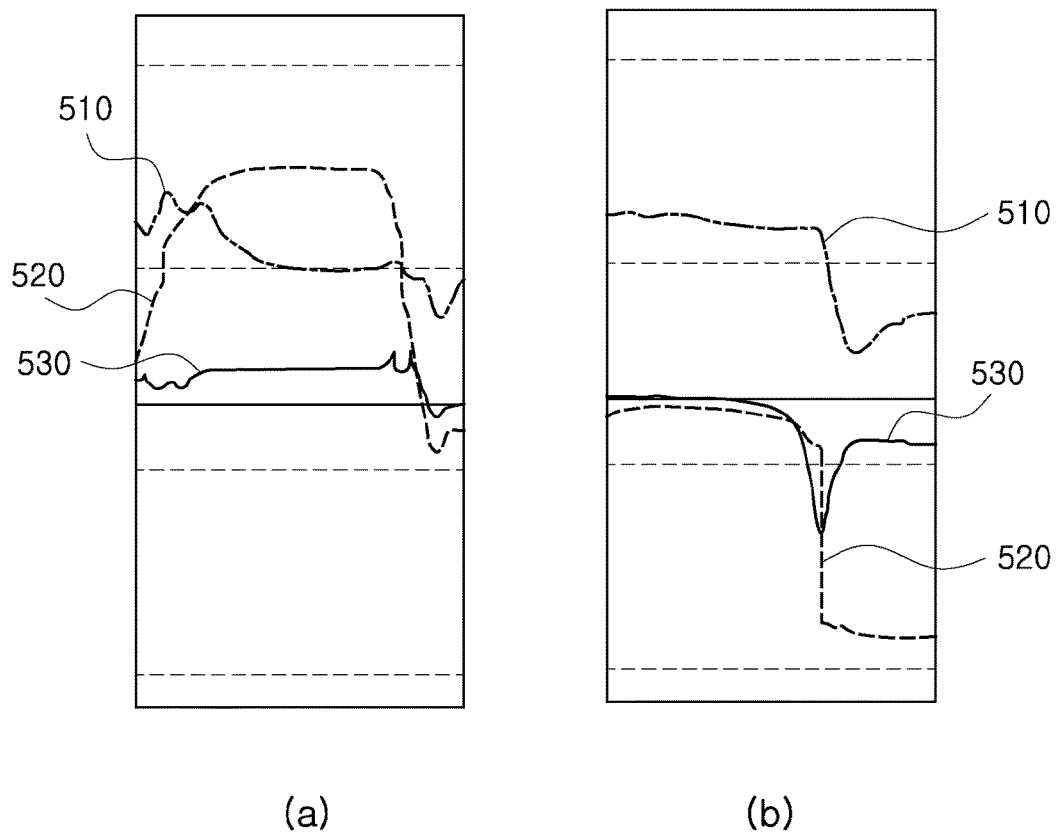

FIGS. 3 to 5 illustratively show how a user interface is provided according to one embodiment of the invention.

Referring to FIGS. 3 and 4, it may be assumed that a user wearing the second device 320 on the left wrist and holding the first device 310 in the left hand makes an action of turning over the left hand (i.e., flipping). In this case, the first device 310 having been facing the user may not face the user any longer, and instead, the second device 320 not having been facing the user may come to face the user (see FIG. 3). On the contrary, the second device 320 having been facing the user may not face the user any longer, and instead, the first device 310 not having been facing the user may come to face the user (see FIG. 4).

Referring to FIG. 5, physical information on postures or directions of the first device 310 and the second device 320, which are measured by means of gyroscopes included in the first device 310 and the second device 320, may be acquired, and the user interface provision system 200 according to one embodiment of the invention may sense whether an input event occurs on the basis of the physical information as shown in FIG. 5. Specifically, (a) and (b) of FIG. 5 indicate the gyroscope measurements of the first device 310 and the second device 320, respectively, and graphs 510, 520, and 530 in each of (a) and (b) of FIG. 5 indicate the measurements in azimuth, pitch and roll directions, respectively.

Meanwhile, according to one embodiment of the invention, in response to the occurrence of an input event according to the user's action of flipping, at least some of contents having been being provided on the first device 310 having been facing the user may be transmitted to the second device 320, or on the contrary, at least some of contents having been being provided on the second device 320 having been facing the user may be transmitted to the first device 310.

Further, according to one embodiment of the invention, in response to the occurrence of an input event according to the user's action of flipping, a process having been being performed on the first device 310 having been facing the user may be performed on the second device 320, or on the contrary, a process having been being performed on the second device 320 having been facing the user may be performed on the first device 310.

Furthermore, according to one embodiment of the invention, in response to the occurrence of an input event according to the user's action of flipping, the format of contents having been being provided on the first device 310 (or the second device 320) before the occurrence of the input event may be different from that of contents provided on the second device 320 (or the first device 310) after the occurrence of the input event.

Figure 6:
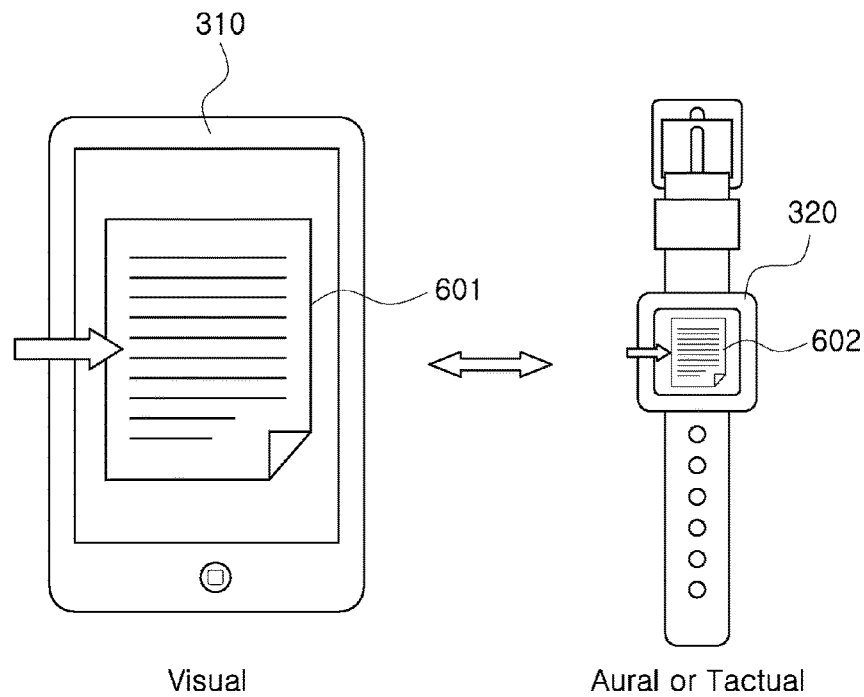
FIG. 6 illustratively shows how the format of contents provided on a first device and that of contents provided on a second device become different from each other according to one embodiment of the invention.

FIG. 6 illustratively shows how the format of contents provided on the first device and that of contents provided on the second device become different from each other according to one embodiment of the invention.

Referring to FIG. 6, contents having been being visually provided on the first device 310 before the occurrence of an input event may be aurally or tactually provided on the second device 320 after the occurrence of the input event. For example, reading contents having been being provided in the form of text on the first device 310, which has a relatively large display screen, may be provided in the form of voice or vibration on the second device 320, which has a relatively small display screen and is worn closely on the user's wrist.

Meanwhile, according to one embodiment of the invention, an input event may be specified on the basis of not only a relative relationship between the posture or motion of the first device 310 and that of the second device 320, but also a user operation inputted to the first device 310 or the second device 320. For example, the user operation inputted to the first device 310 or the second device 320 may include a touch operation, a keyboard operation, a voice recognition operation, and the like.

Specifically, according to one embodiment of the invention, in response to the occurrence of an input event in which the user makes an action of flipping and also touches a specific content displayed on a display screen of the first device 310 or the second device 320, the specific content associated with the touch operation among contents having been being provided on the first device 310 having been facing the user may be provided on the second device 320, or on the contrary, the specific content associated with the touch operation among contents having been being provided on the second device 320 having been facing the user may be provided on the first device 310.

Figure 7:
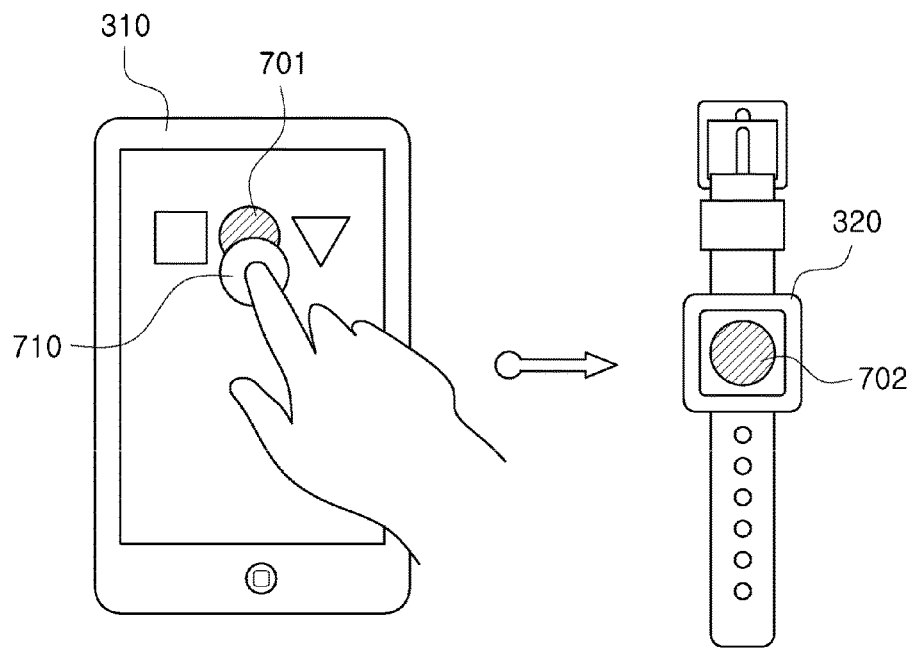
FIG. 7 illustratively shows how contents stored in a first device are transmitted to a second device according to one embodiment of the invention.

FIG. 7 illustratively shows how contents stored in the first device are transmitted to the second device according to one embodiment of the invention.

Referring to FIG. 7, only specific contents 701, 702 (e.g., specific audio files), which are selected by a touch operation 710 of a user from among contents having been being provided on the first device 310 before the occurrence of an input event, may be provided on the second device 320 after the occurrence of the input event.

Figure 20:
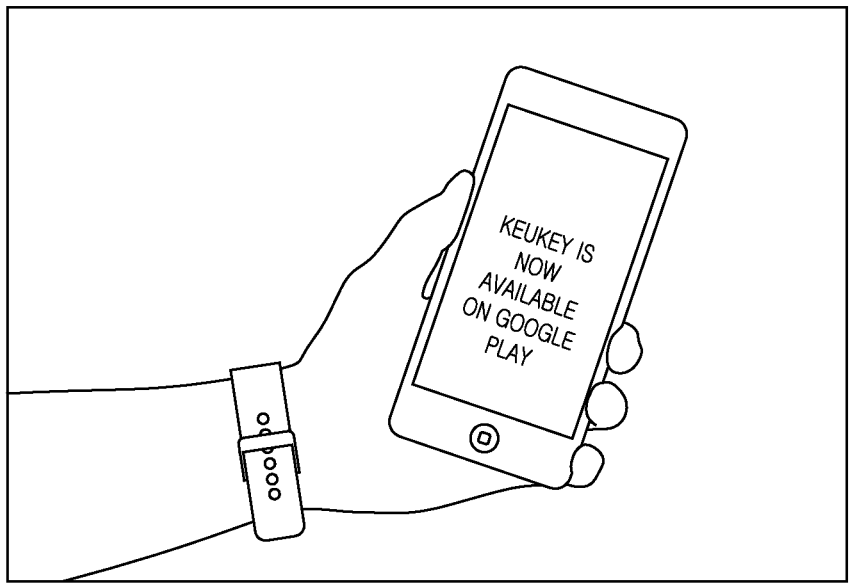
Figure 21:
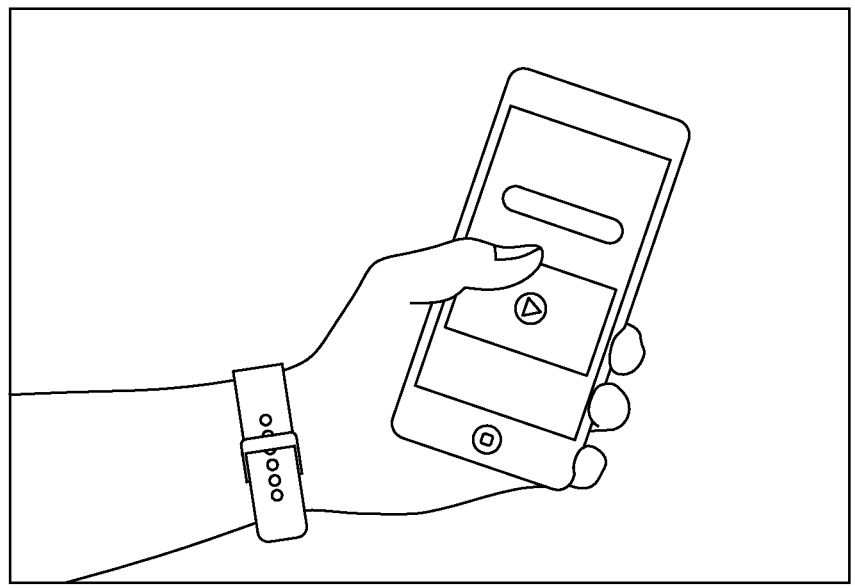
Figure 22:
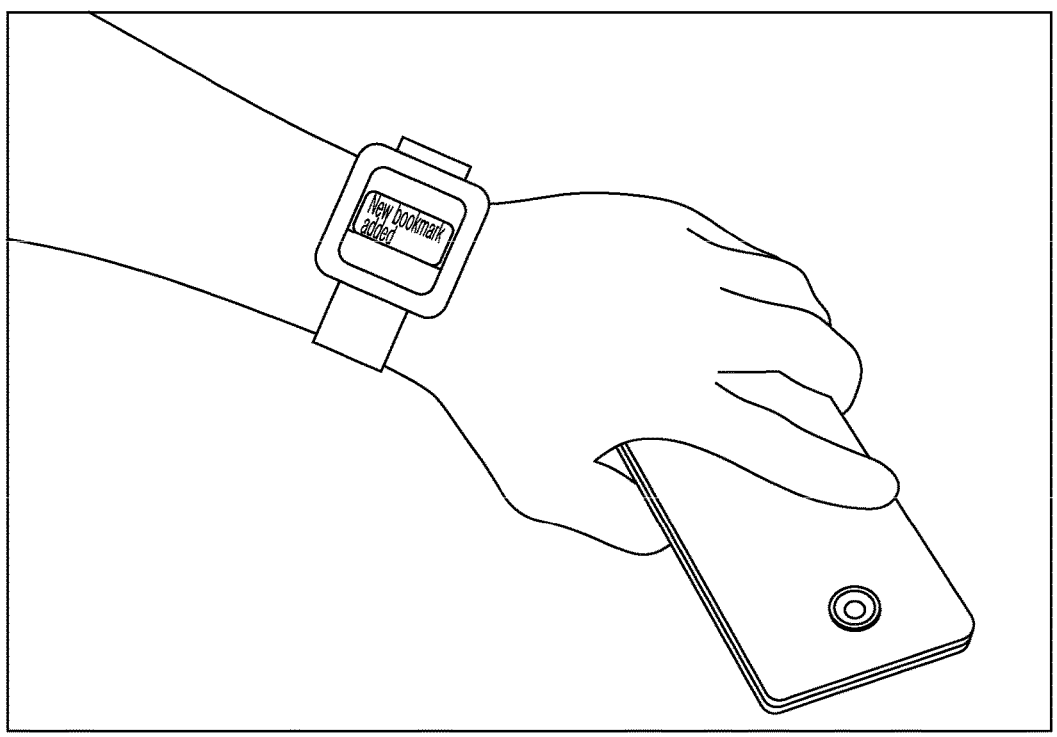

Further, according to one embodiment of the invention, in response to the occurrence of an input event in which the user makes an action of flipping to cause the second device 320 to face the user and also touches a specific content (e.g., a web page) displayed on a display screen of the first device 310, the user interface provision system 200 may cause the content having been being provided on the first device 310 having been facing the user to be registered as a bookmark (or favorite), and cause a list including the bookmark to be displayed on the second device 320. Furthermore, according to one embodiment of the invention, in response to the occurrence of an input event in which the user makes an action of flipping to cause the first device 310 to face the user and also selects (i.e., touches) a specific bookmark from a bookmark list (e.g., a list of bookmarked web pages) displayed on a display screen of the second device 320, the user interface provision system 200 may cause the content corresponding to the specific bookmark selected on the second device 320 having been facing the user to be displayed on the first device 310. Referring to FIGS. 20 to 22, it can be seen how the above embodiment is actually demonstrated.

Meanwhile, it is noted that although the embodiments in which an input event is specified by the user's action of turning over the hand once have been mainly described above, the present invention is not necessarily limited thereto, and an input event may also be specified by any other actions (e.g., turning over the hand twice or more times) as long as the objects of the invention may be achieved.

Further, it is noted that although the embodiments in which the first device is a smart phone held in the user's hand and the second device is a smart watch worn on the user's wrist have been mainly described above, the present invention is not necessarily limited thereto, and the first and second devices may also be implemented in any other forms such as a smart pad, a smart glass, a smart band, and a smart ring, as long as the objects of the invention may be achieved.

FIGS. 8 to 15 illustratively show how a user interface is provided according to another embodiment of the invention.

Figure 8:
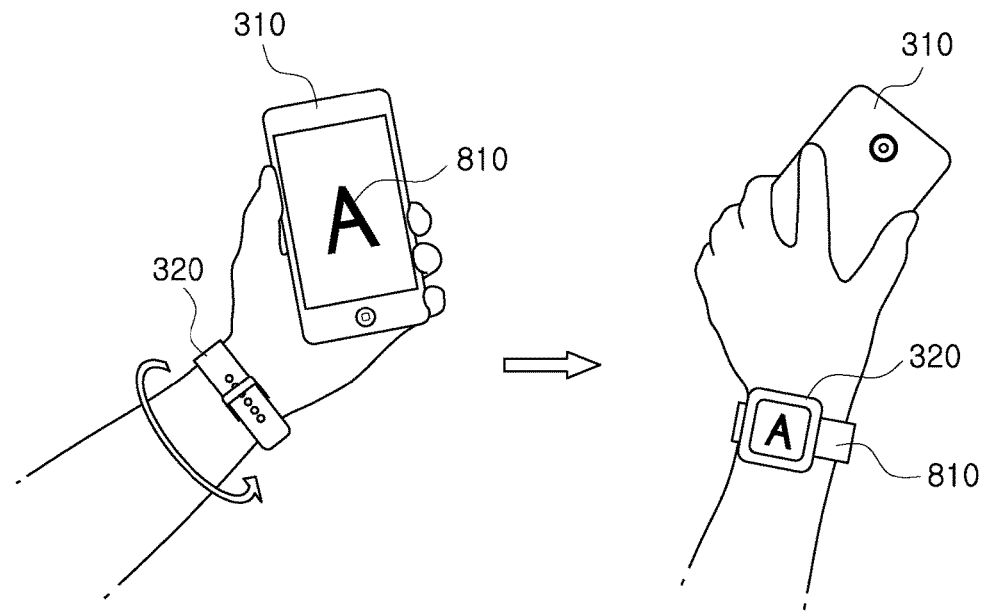
FIGS. 8 to 15 illustratively show how a user interface is provided according to another embodiment of the invention.

First, referring to FIG. 8, when a user makes an action of flipping to turn over the hand carrying both of the first device 310 and the second device 320 facing different directions, the user interface provision system 200 according to another embodiment of the invention may recognize the above action as an input event in which the aspect of direction change of the first device 310 in the form of a smart phone is opposite or symmetrical to that of direction change of the second device 320 in the form of a smart watch. Then, in response to the occurrence of the above input event, the user interface provision system 200 according to another embodiment of the invention may mirror at least some of contents (or functions) 810 having been being provided on the first device 310, a display screen of which has been facing the user before the occurrence of the input event, and may cause the mirrored contents (or functions) 810 to be provided on not only the first device 310 but also the second device 320, a display screen of which has come to face the user after the occurrence of the input event. Thereby, the user may check via the second device 320 what contents (or functions) are being provided to another person on the first device 310, even in a state in which the user has rotated the wrist so that the first device 310 faces the other person.

Figure 9:
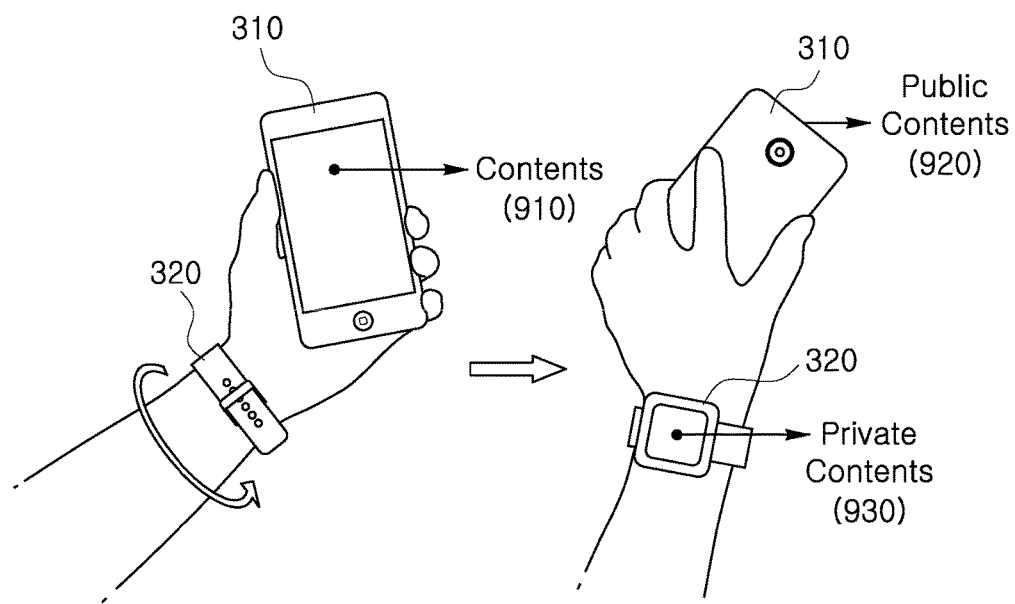

Next, referring to FIG. 9, in response to the occurrence of an input event in which the user makes an action of flipping as mentioned with FIG. 8, the user interface provision system 200 according to another embodiment of the invention may classify contents (or functions) 910 having been being provided on the first device 310, a display screen of which has been facing the user before the occurrence of the input event, into public contents 920 and private contents 930, and may cause the public contents 920 to be displayed on the first device 310, the display screen of which has come to face another person after the occurrence of the input event, and cause the private contents 930 to be displayed on the second device 320, which has come to face the user after the occurrence of the input event. Thereby, the public contents and the private contents may be discriminately displayed according to the user's situation.

Figure 10:
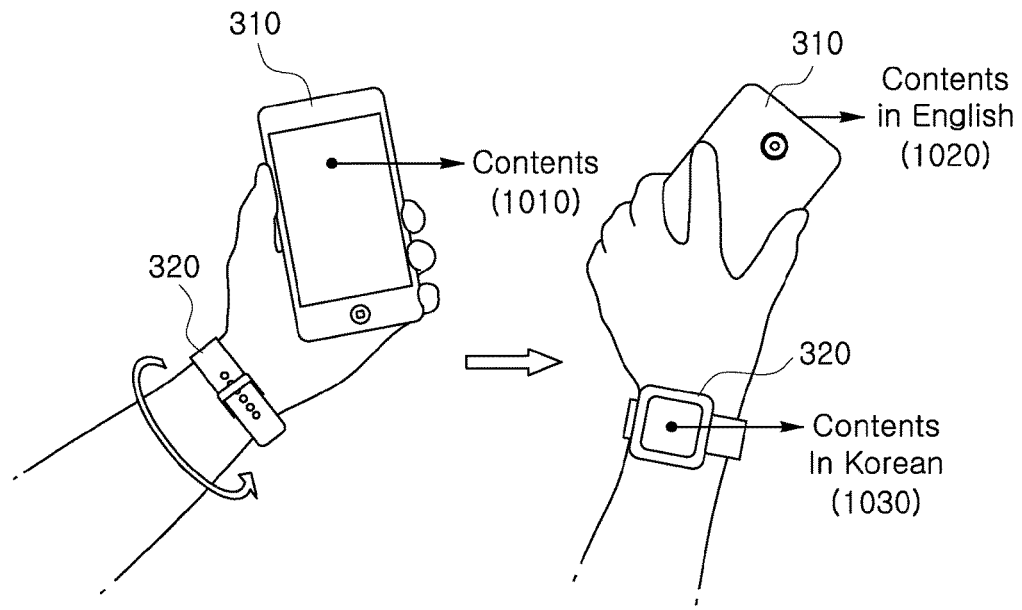

Next, referring to FIG. 10, in response to the occurrence of an input event in which the user makes an action of flipping as mentioned with FIG. 8, the user interface provision system 200 according to another embodiment of the invention may translate a language of contents (or functions) 1010 having been being provided on the first device 310, a display screen of which has been facing the user before the occurrence of the input event, into another language, and may cause contents 1020 in a first language (e.g., English) to be displayed on the first device 310, the display screen of which has come to face another person after the occurrence of the input event, and cause contents 1030 in a second language (e.g., Korean) to be displayed on the second device 320, which has come to face the user after the occurrence of the input event.

Figure 11:
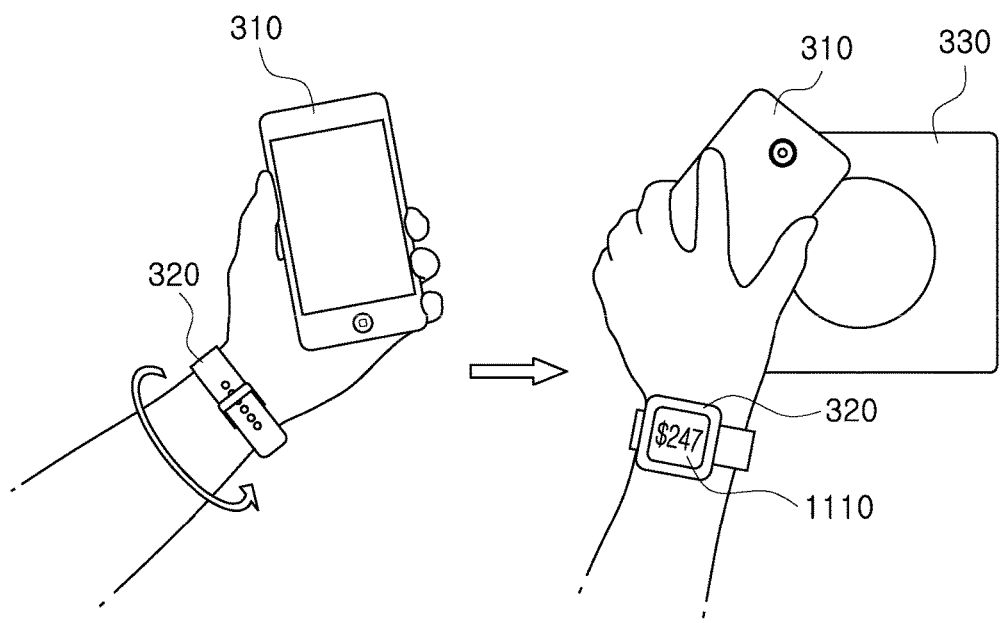
Figure 12:
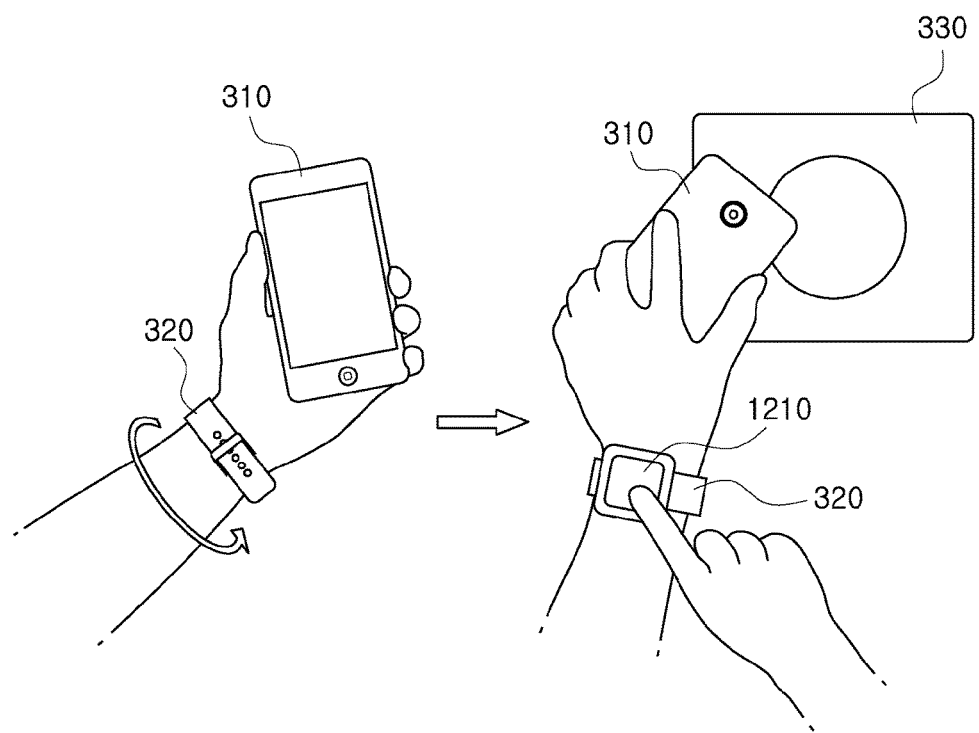

Next, referring to FIGS. 11 and 12, it may be assumed that a user makes payment based on near field communication using the first device 310 in the form of a smart phone being held in the user's hand. In this case, in response to the occurrence of an input event in which the user makes an action of flipping as mentioned with FIG. 8, the user interface provision system 200 according to another embodiment of the invention may cause various payment-related information 1110 (e.g., the amount of the payment) to be displayed on the second device 320, which has come to face the user after the occurrence of the input event, instead of the first device 310, a display screen of which has come to face a payment processing apparatus 330 (e.g., RFID reader) after the occurrence of the input event (see FIG. 11). Further, in response to the occurrence of an input event in which the user makes an action of flipping as mentioned with FIG. 8, the user interface provision system 200 according to another embodiment of the invention may cause a function 1210 for supporting touch-operation based signature input to be provided on the second device 320, which has come to face the user after the occurrence of the input event, instead of the first device 310, the display screen of which has come to face the payment processing apparatus 330 (e.g., RFID reader) after the occurrence of the input event (see FIG. 12).

Figure 13:
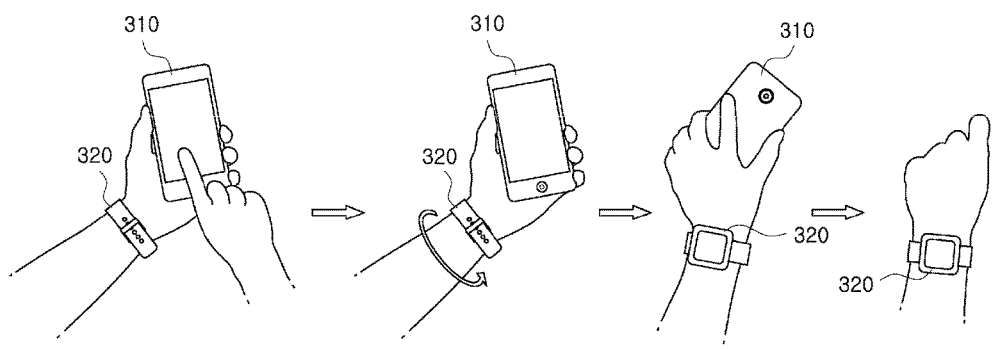

Next, referring to FIG. 13, it may be assumed that a user takes exercise such as running with the second device 320 worn on the user's wrist. In this case, in response to the occurrence of an input event in which the user makes a touch operation to select a destination on the first device 310 and also makes an action of flipping as mentioned with FIG. 8, the user interface provision system 200 according to another embodiment of the invention may cause various exercise-related contents (e.g., the current location, remaining distance or time to the destination, music, etc.) to be displayed on the second device 320, which may be easily operated by the user during the exercise.

Figure 14:
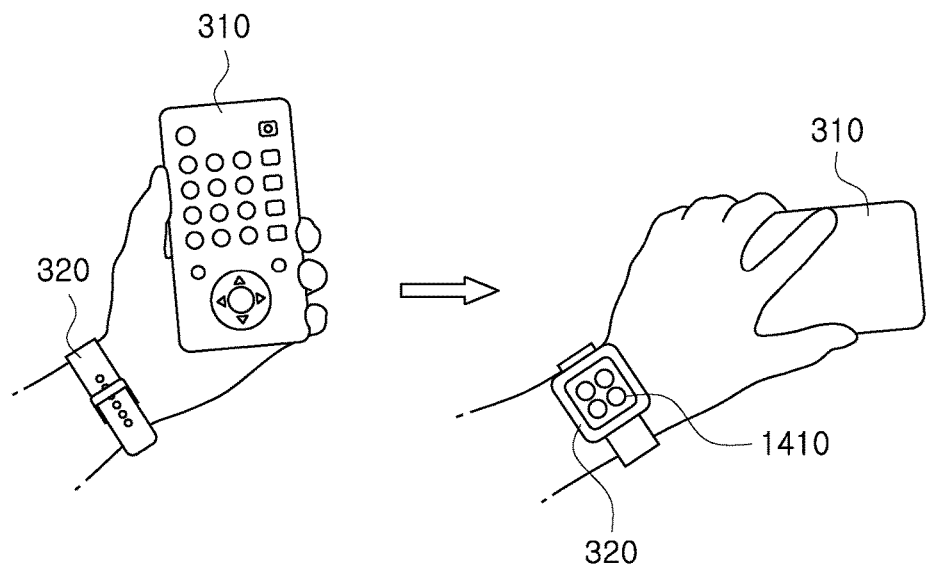

Next, referring to FIG. 14, it may be assumed that a user holds an IoT home appliance like a remote control (corresponding to the first device 310) in a hand with the second device 320 worn on a wrist of the same hand. In this case, in response to the occurrence of an input event in which the user makes an action of flipping as mentioned with FIG. 8, the user interface provision system 200 according to another embodiment of the invention may cause a user operation interface 1410 of the IoT home appliance like a remote control, which is the first device 310, to be displayed on the second device 320, which has come to face the user after the occurrence of the input event.

Figure 15:
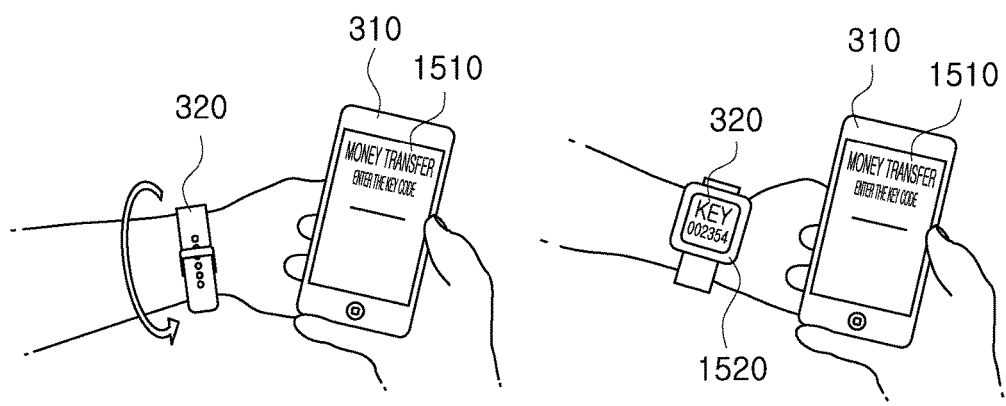

Next, referring to FIG. 15, it may be assumed that a user performs a security-demanding task with the first device 310 in the form of a smart phone being held in one hand and with the second device 320 in the form of a smart watch being worn on a wrist of the other hand. In this case, in response to the occurrence of an input event in which the user makes an action of, for example, rotating the wrist of the hand wearing the second device 320 so that both of the first device 310 and the second device 320 face the user, the user interface provision system 200 according to another embodiment of the invention may cause additional contents (or functions) 1520 (e.g., a security key code to be entered), which are associated with contents (or functions) 1510 provided on the first device 310 (e.g., a function for supporting the user to enter a security key code), to be displayed on the second device 320. Thereby, convenience and security may be enhanced when the user performs a task of entering security information such as a password.

Figure 18:
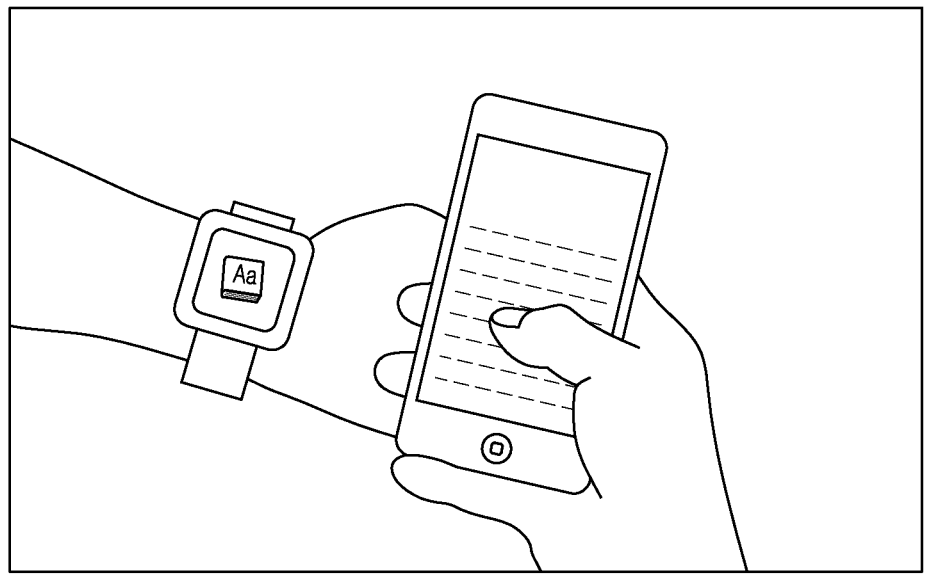
Figure 19:
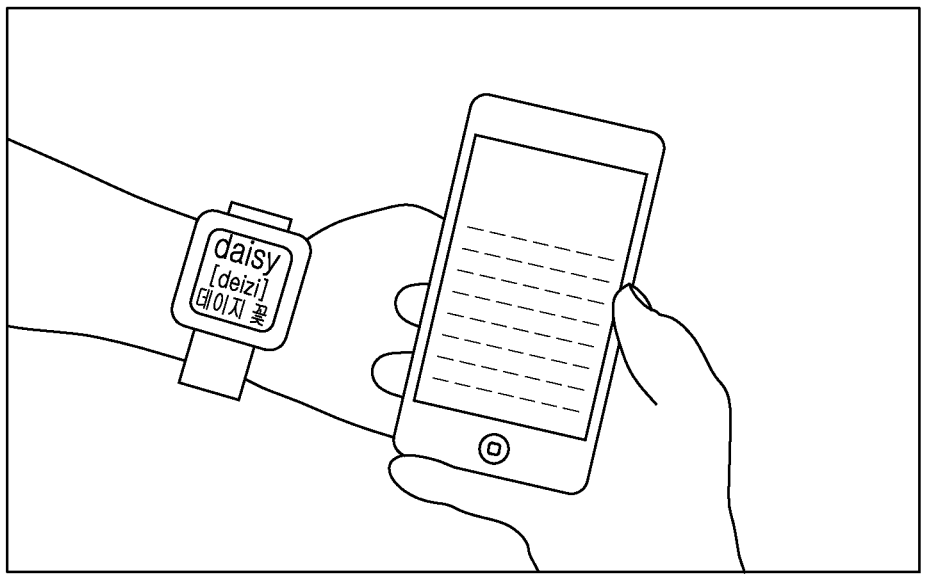

Meanwhile, in response to the occurrence of an input event in which the user makes an action of, for example, rotating the wrist of the hand wearing the second device 320 so that both of the first device 310 and the second device 320 face the user, and also makes a touch operation to select a specific text from among contents being displayed on the first device 310, the user interface provision system 200 according to another embodiment of the invention may cause information on a translation of the specific text or a search result of a linguistic dictionary to be displayed on the second device. Referring to FIGS. 18 and 19, it can be seen how the above embodiment is actually demonstrated.

Meanwhile, it may be assumed that in a situation in which a first user wearing a first device in the form of a smart watch on the right wrist and a second user wearing a second device in the form of a smart watch on the left wrist make a handshake using the right and left hands, respectively, an input event occurs in which the first and second users make an action of flipping to rotate the clasping hands. In this case, the user interface provision system 200 according to another embodiment of the invention may cause at least some of contents (or functions) being provided on the first device worn by the first user to be provided on the second device worn by the second user, or on the contrary, cause at least some of contents (or functions) being provided on the second device worn by the second user to be provided on the first device worn by the first user. Thereby, a user has only to make an action of flipping while making a handshake with another user using the hand wearing a device so that contents may be provided from or to a device of the other user.

The embodiments according to the invention as described above may be implemented in the form of program instructions that can be executed by various computer components, and may be stored on a non-transitory computer-readable recording medium. The non-transitory computer-readable recording medium may include program instructions, data files, data structures and the like, separately or in combination. The program instructions stored on the non-transitory computer-readable recording medium may be specially designed and configured for the present invention, or may also be known and available to those skilled in the computer software field. Examples of the non-transitory computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A non-transitory computer-readable recording medium having stored thereon a computer program for executing a method for providing a user interface, comprising the steps of:
   (a) acquiring information on postures or motions of a first device and a second device, and sensing an input event specified on the basis of a relative relationship between the posture or motion of the first device and that of the second device, wherein the first device is a smart device, held by a user, configured to make a payment by a near field communication with a payment processing apparatus, and the second device is a smart device worn by the user; and
   (b) causing, in response to the occurrence of the input event, a user operation interface of the first device to be displayed on the second device; and
   (c) processing, by the first device, a payment by the near field communication with the payment processing apparatus, in response to an input to the second device for permitting the payment,
   wherein in step (a), the occurrence of the input event is sensed if the aspect of direction change of the first device is opposite or symmetrical to that of direction change of the second device,
   wherein in step (a), the second device faces the user and the first device faces the payment processing apparatus after the occurrence of the input event if the first device has been facing the user before the occurrence of the input event, and
   wherein in step (b), in response to the occurrence of the input event, at least some of contents having been being provided on the first device before the occurrence of the input event are provided on the second device after the occurrence of the input event, and wherein the at least some of the contents include payment-related information.

2. The non-transitory computer-readable recording medium of claim 1, wherein in step (b), the format of the at least some of the contents having been being provided on the first device before the occurrence of the input event is different from that of the at least some of the contents provided on the second device after the occurrence of the input event.

3. The non-transitory computer-readable recording medium of claim 1, wherein the input event is specified on the further basis of a user operation inputted to at least one of the first device and the second device.

4. A device for providing a user interface, comprising:
   a sensing module for acquiring information on postures or motions of the device and another device associated with the device, and sensing an input event specified on the basis of a relative relationship between the posture or motion of the device and that of the another device, wherein the device is a smart device, held by a user, configured to make a payment by a near field communication with a payment processing apparatus, and the another device is a smart device worn by the user; and
   a program module for, causing, in response to the occurrence of the input event, a user operation interface of the device to be displayed on the another device, and processing a payment by the near field communication with the payment processing apparatus, in response to an input to the another device for permitting the payment,
   wherein the sensing module senses the occurrence of the input event if the aspect of direction change of the device is opposite or symmetrical to that of direction change of the another device,
   wherein the another device faces the user and the device faces the payment processing apparatus after the occurrence of the input event if the device has been facing the user before the occurrence of the input event, and
   wherein, in response to the occurrence of the input event, at least some of contents having been being provided on the device before the occurrence of the input event are provided on the another device after the occurrence of the input event, and wherein the at least some of the contents include payment-related information.

5. A system for providing a user interface, comprising:
a control unit for acquiring information on postures or motions of a first device and a second device, wherein the first device is a smart device, held by a user, configured to make a payment by a near field communication with a payment processing apparatus, and the second device is a smart device worn by the user, sensing an input event specified on the basis of a relative relationship between the posture or motion of the first device and that of the second device, causing, in response to the occurrence of the input event, a user operation interface of the first device to be displayed on the second device, and processing, by the first device, a payment by the near field communication with the payment processing apparatus, in response to an input to the second device for permitting the payment; and
a storage for storing information provided from at least one of the first device and the second device,
wherein the control unit senses the occurrence of the input event if the aspect of direction change of the first device is opposite or symmetrical to that of direction change of the second device, wherein the second device faces the user and the first device faces the payment processing apparatus after the occurrence of the input event if the first device has been facing the user before the occurrence of the input event, and wherein, in response to the occurrence of the input event, at least some of contents having been being provided on the first device before the occurrence of the input event are provided on the second device after the occurrence of the input event, and wherein the at least some of the contents include payment-related information.

6. The system of claim 5, wherein the format of the at least some of the contents having been being provided on the first device before the occurrence of the input event is different from that of the at least some of the contents provided on the second device after the occurrence of the input event.

7. The system of claim 5, wherein the input event is specified on the further basis of a user operation inputted to at least one of the first device and the second device.

* * * * *